United States Patent [19]
Horvath et al.

[11] 3,990,664
[45] Nov. 9, 1976

[54] MOUNTING BRACKET FOR REFLECTORS
[75] Inventors: Stephen Horvath, Naperville; Henry Lindner, Wood Dale, both of Ill.
[73] Assignee: Beatrice Foods Co., Elgin, Ill.
[22] Filed: Oct. 4, 1974
[21] Appl. No.: 512,091

[52] U.S. Cl. .................... 248/205 R; 280/289 A; 350/97; 403/339
[51] Int. Cl.² ............................................ G02B 5/12
[58] Field of Search ............... 248/460, 466, 475 R, 248/479, 489, 497, 498, 495, 496, 288 R, 317, 322, 339–341; 403/11, 13, 14, 339; 224/30 R, 39; 52/758 F, 758 D; 280/289; 350/97, 100, 288, 309, 310

[56] References Cited
UNITED STATES PATENTS

| | | | |
|---|---|---|---|
| 1,130,610 | 3/1915 | Kane | 403/339 |
| 2,312,985 | 3/1943 | Bales | 52/758 F X |
| 3,289,555 | 12/1966 | Steenberg | 350/97 X |
| 3,694,051 | 9/1972 | Dian | 280/289 X |

Primary Examiner—Roy D. Frazier
Assistant Examiner—Terrell P. Lewis
Attorney, Agent, or Firm—Hill, Gross, Simpson, Van Santen, Steadman, Chiara & Simpson

[57] ABSTRACT

A hanger for a bicycle reflector so as to maintain the reflective face of the reflector in a generally vertical position and which includes means that prevent the reflector from being incorrectly mounted on the bicycle.

7 Claims, 7 Drawing Figures

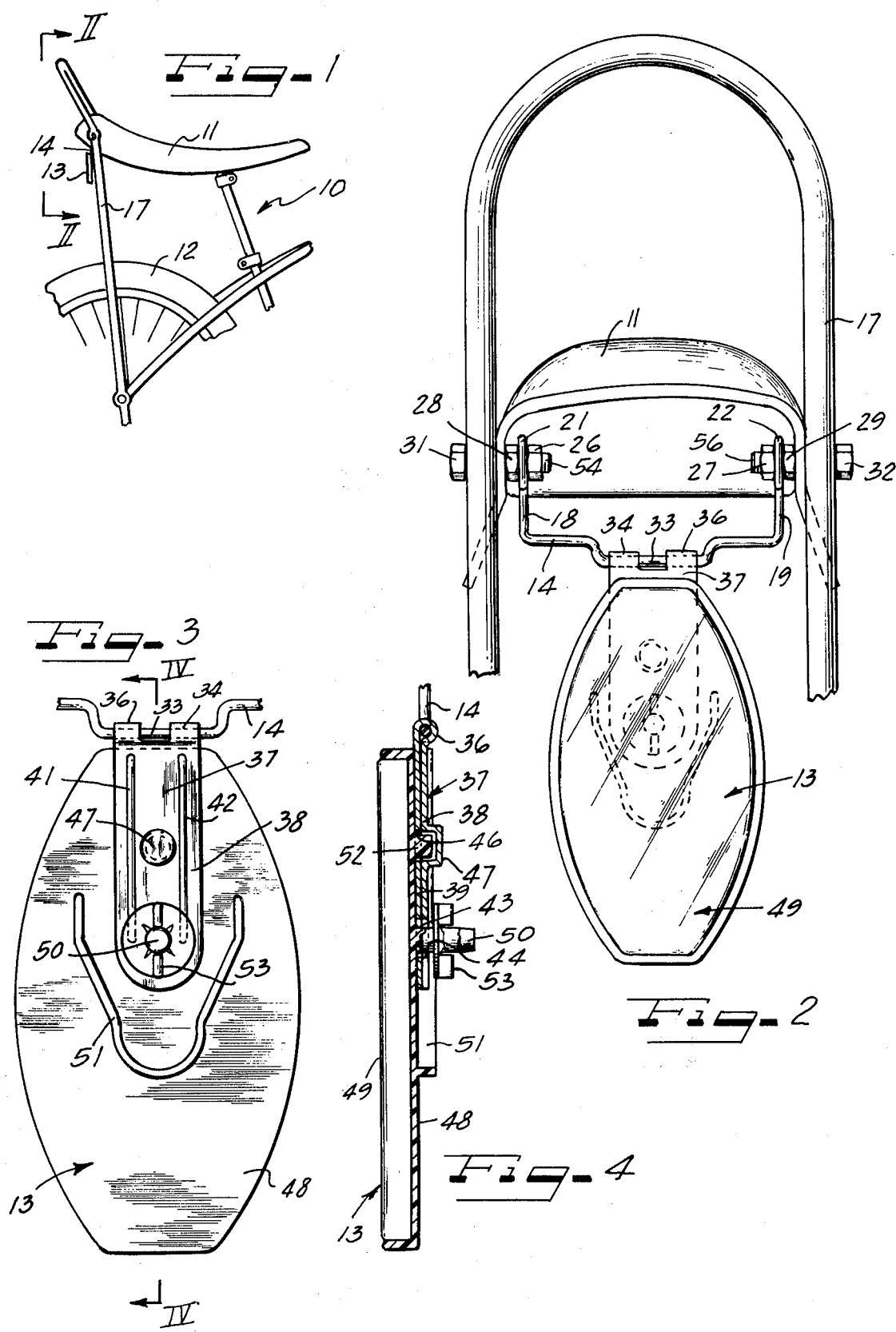

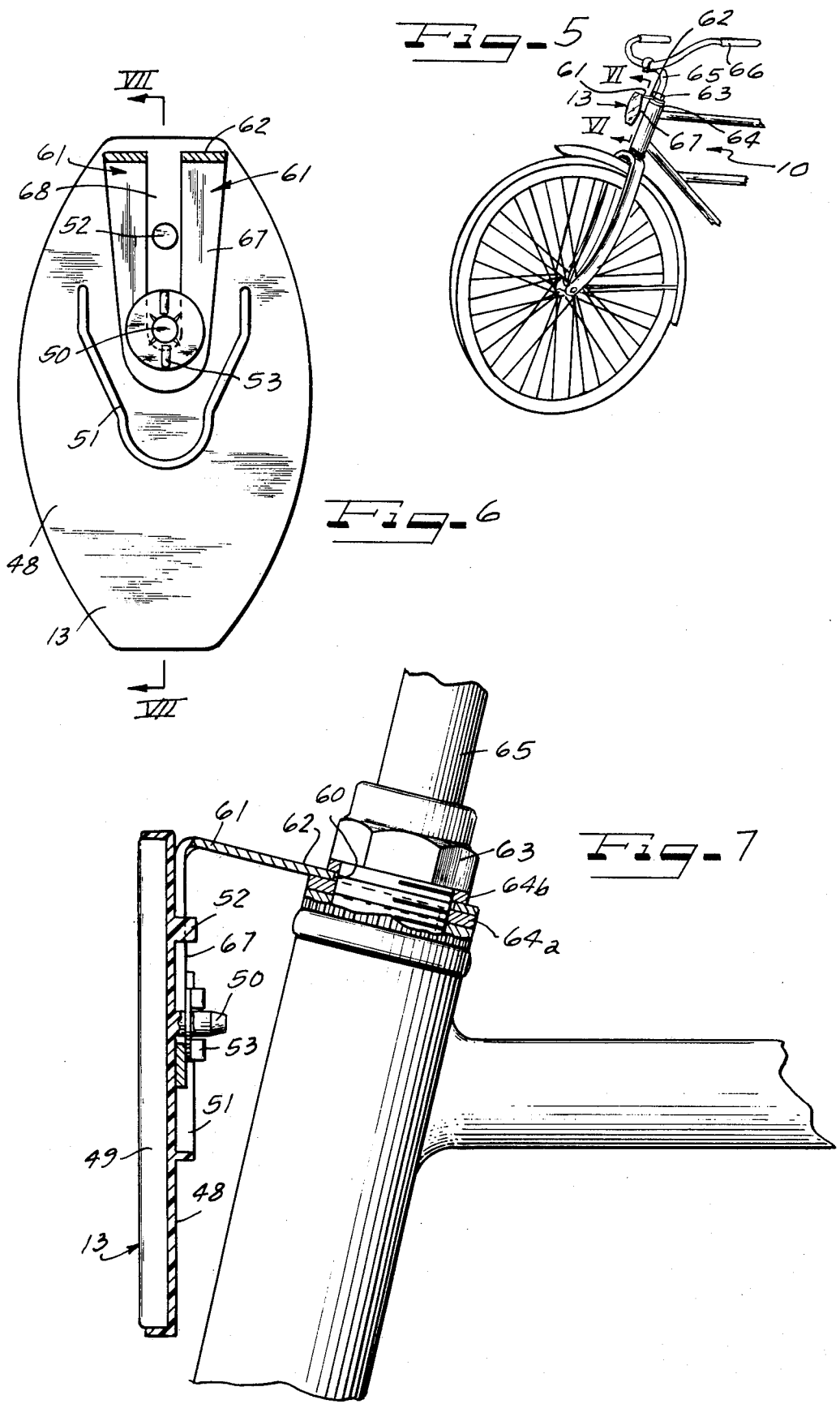

MOUNTING BRACKET FOR REFLECTORS

BACKGROUND OF THE INVENTION

1. Field of the Invention

This invention relates in general to brackets for mounting reflectors on bicycles.

2. Description of the Prior Art

U.S. Pat. No. 3,694,051, which issued on Sept. 26, 1972, discloses a bicycle reflector and hanger which maintains the reflector substantially in the vertical plane.

SUMMARY OF THE INVENTION

The present invention relates to brackets of an improved nature for mounting a reflector on the seat or front and wherein means are provided such that the reflector cannot be mounted incorrectly or upside down. In one embodiment, a rim is formed about a pair of projecting pins on the back of the reflector such that the bracket can be mounted in only one direction relative to the reflector. One embodiment has a pair of openings mountable over the extending pins with a cup-shape cover member over one of the openings to receive one of the pins and the cup-shape member with the rim formed on the bracket prevents the bracket from being mounted improperly. The other embodiment is formed with a slot through which the pair of pins extend and the rim prevents the bracket from being mounted except in one direction. Thus, the invention allows disassembled reflectors to be purchased and means are provided so that they cannot be improperly mounted on the bicycle.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a diagrammatic side view showing a bicycle seat and its support illustrating the reflector bracket holder of the invention;

FIG. 2 is an enlarged view of the bicycle seat, hanger, and the reflector from the rear of the bicycle;

FIG. 3 is the rear view of the reflector illustrating the connection between the bracket and the reflector;

FIG. 4 is a sectional view taken on line IV—IV from FIG. 3;

FIG. 5 illustrates the front view of a modified bracket and reflector of the invention;

FIG. 6 is the rear view of the reflector and bracket of FIG. 5; and

FIG. 7 is sectional view taken on line VII—VII from FIG. 6.

DESCRIPTION OF THE PREFERRED EMBODIMENTS

FIG. 1 is a partial view of a bicycle having a frame 10 and a seat 11 and rear wheel 12 rotatably mounted to the frame. A U-shaped supporting member 17 is connected to the frame and supports one end of the seat 11 by bolts 31 and 32 which pass through openings in the U-shaped member 17 on either side thereof as shown in FIG. 2 and through opposite sides of the seat as shown. A bracket 14 has upwardly extending portions 18 and 19 as shown in FIG. 2 and loop portions 21 and 22 at the upper ends thereof which fit about the bolts 31 and 32 and nuts 26 and 27 lock the bracket 14 to the bolts 31 and 32, respectively.

A center portion 33 of the bracket 14 is formed in a U-shape and the reflector supporting bracket 37 of the invention is received around the portion 33 and has pivot hinge portions 34 and 36 on the outer edges thereof. The bracket 37 comprises two flat parallel mounted portions 38 and 39 which overlie each other and each portion 38 and 39 is formed with longitudinally extending reinforcing ribs 41 and 42 as shown in FIG. 3, for example. The portions 38 and 39 are each formed with first openings 43 and 44 as best shown in FIG. 4. The portion 39 is formed with an opening 46 and a cup-shaped indention 47 is formed in the portion 38.

A reflector 13 has a back side 48 and a front reflector side 49. Mounted on the back side 48 is a generally U-shaped rib 51 as shown in FIG. 3. On the back 48 of the reflector 13 a pair of extending pins 50 and 52 are mounted with the pin 50 being longer and smaller in diameter than the pin 52. The pin 50 is substantially enclosed within the rib 51 as shown in FIG. 3. A squeeze nut 53 is receivable on the pin 50 so as to lock the bracket 37 to the reflector 13.

To mount the reflector onto the bicycle, the loops 21 and 22 of the bracket 14 are placed over the inner ends of the bolts 31 and 32 and the nuts 26 and 27 are threaded onto the ends 54 and 56 of the bolts 31 and 32 to lock the bracket to the seat. The member 37 is pivotally supported by the hinge portions 34 and 36 from the center portion 33 of the bracket 14 and the reflector 13 is mounted to the member 37 by inserting the pin 52 into the openings 46 and the cup 47 and the pin 50 through the openings 43 and 44. Then the squeeze nut 53 is pressed onto the pin 50 thus locking the reflector 13 to the bracket 37.

It is to be particularly noted that the reflector 13 cannot be mounted on the pins 52 and 50 in an incorrect orientation due to the cup-shaped member 47 and the rib 51. The pin 52 cannot be passed through the openings 43 and 44 and the squeeze nut 53 placed thereon because the pin 52 is too short to receive the squeeze nut 53. Neither can the reflector 13 be mounted upside down on the bracket 37 because the cup 47 and the rib 51 prevent the pin from passing through the cup 47 and the rib 51 would hold the bracket 37 away from the back side of the reflector 13.

Thus, a pivoted reflector is provided which can be purchased by ordinary users and can be mounted on a bicycle such that the reflector is properly mounted.

FIGS. 5, 6, and 7 illustrate a modification of the invention wherein the same reflector illustrated in FIGS. 1–4 can be mounted to the bicycle with a different bracket. The reflector 13 is mounted to the front of a bicycle frame 10 as shown in FIG. 5 by a generally L-shaped bracket 61 which has a portion 62 formed with an opening 60 which can be mounted to the front of the frame between nut 63 and spacer washers 64a and b. The opening 60 allows the gooseneck 65 which supports the handlebars 66 to pass therethrough. A downwardly extending portion 67 of the bracket 61 is formed with a slot 68 as best shown in FIG. 6 and the pins 52 and 50 of the reflector are receivable in the slot 68 as shown in FIG. 6. Squeeze nut 53 is receivable over the pin 50 so as to lock the reflector 13 to the portion 67 of the bracket 61. The rib 51 on the back 48 of the reflector 13 prevents the reflector from being mounted on the bracket 61 except in the orientation illustrated in FIGS. 5, 6, and 7.

It is seen that this invention provides new and novel brackets for mounting reflectors or other devices and which assure that the reflectors will not be improperly connected to the brackets.

Although the invention has been described with respect to preferred embodiments, it is not to be so limited as changes and modifications may be made which are within the full intended scope as defined by the appended claims.

We claim as our invention:

1. Means for joining a pair of members in a single orientation wherein the first of said pair of members has a pair of spaced projections aligned on an axis, a generally U-shaped rib portion attached to said first of said pair of members and at least one of said projections mounted within said U-shaped rib portion, the second of said pair of members having a first planar portion formed with at least one opening through which said pair of spaced projections extend, and holding means mounted on at least one of said projections to join said pair of members together, wherein said second of said pair of members is L-shaped with a second planar portion forming one of said legs and attached to said first planar portion which forms the other leg, and an opening formed in said second planar portion for mounting said pair of members.

2. Means for joining a pair of members in a single orientation wherein the first of said pair of members has a pair of spaced projections aligned on an axis, one of said members comprising a flat base with major and minor axes and having a reflector attached to one surface, a generally U-shaped rib portion attached to the other side of said base and encompassing the center of said base and extending in the same direction as said projections and aligned on the major axis of said base and to one side of the minor axis of the base, and at least one of said projections mounted within said U-shaped rib portion, the second of said pair of members having a first planar portion formed with at least one opening through which said pair of spaced projections extend in a single orientation of said pair of members, holding means mounted on at least one of said projections to join said pair of members together, wherein said one projection is longer than the other projection and said holding means receivable on only said one projection, wherein said holding means is a gripper nut, and wherein said pair of projections lie on said major axis and have different transverse dimensions, such that said first and second members can be joined only in a single orientation.

3. Means for joining according to claim 2 wherein said opening in said second of said pair of members is a slot.

4. Means for joining according to claim 2 wherein said second of said pair of members is formed with a pair of holes through which said pair of spaced projections extend.

5. Means for joining according to claim 2 wherein said second of said pair of members is formed with a cup-shaped depression into which the other of said projections extends.

6. Means for joining according to claim 1 wherein the second of said pair of members is formed with a pair of legs folded to be parallel to each other and each leg formed with a pair of openings aligned with the openings of the other leg, and said second of said pair of members further includes a bracket portion to which said parallel pair of legs are pivotally attached.

7. Means for holding according to claim 6 including attaching means formed on opposite ends of said bracket portion.

* * * * *